United States Patent
Morse et al.

(10) Patent No.: US 6,650,802 B1
(45) Date of Patent: *Nov. 18, 2003

(54) METHOD AND APPARATUS FOR SWITCHING AN OPTICAL BEAM

(75) Inventors: Michael T. Morse, Sunnyvale, CA (US); Mario J. Paniccia, Santa Clara, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/470,574

(22) Filed: Dec. 22, 1999

(51) Int. Cl.⁷ ................................................. G02B 6/26
(52) U.S. Cl. ............................ 385/17; 385/14; 385/131
(58) Field of Search .................. 385/1–3, 14, 129–132; 438/21, 27, 31, 65, 69, 116; 359/248, 263; 257/798, 432, 434, 436, 447, 460

(56) References Cited

U.S. PATENT DOCUMENTS

| 4,923,264 A | | 5/1990 | Langer et al. |
| 5,027,253 A | * | 6/1991 | Lauffer et al. ............... 361/321 |
| 6,052,498 A | * | 4/2000 | Paniccia ....................... 385/14 |
| 6,147,366 A | * | 11/2000 | Drottar et al. ................ 257/82 |
| 6,222,963 B1 | * | 4/2001 | Grand et al. .................. 385/39 |
| 6,393,169 B1 | * | 5/2002 | Paniccia et al. .............. 385/14 |

OTHER PUBLICATIONS

E.D. Novak, L. Ding, Y.T. Loh, and C. Hu, "Speed, Power, and Yield Comparison of Thin Bonded SOI versus Bulk SMOS Technologies", in *Proceedings 1994 IEEE International SOI Conference*, Oct. 1994, VLSI Technology, Inc., San Jose, CA, pp. 41–42.

* cited by examiner

Primary Examiner—Frank G. Font
Assistant Examiner—Michael P. Mooney
(74) *Attorney, Agent, or Firm*—Blakely, Sokoloff, Taylor & Zafman LLP (57) ABSTRACT

A device for switching an optical beam. In one embodiment, the disclosed optical switching device includes an array of trench capacitors providing a phase array disposed between an optical input port and an optical output port in a semiconductor substrate of an integrated circuit die. In one embodiment, the trench capacitors are biased with control circuitry disposed in the semiconductor substrate on the same integrated circuit die. In one embodiment, the array of trench capacitors are biased by the control circuitry to control a charge distribution in the array to switch an optical beam passing from the optical input port through the array of trench capacitors to the optical output port. In another embodiment, there are a plurality of N optical output ports opposite the optical input port and a phase array is provided by the array of trench capacitors. The array of trench capacitors is biased to control a charge distribution across the phase array. Thus, an incident optical beam from the optical input port is selectively directed to any one of the plurality of N optical output ports. In yet another embodiment, there are a plurality of M optical input ports and corresponding phase arrays opposite the plurality of M optical output ports to provide an M×N optical switch.

30 Claims, 5 Drawing Sheets

METHOD AND APPARATUS FOR SWITCHING AN OPTICAL BEAM

BACKGROUND OF THE INVENTION

1. Field of the Invention

The present invention relates generally to the interconnecting signals between devices and, more specifically, the present invention relates to switching or routing optical signals.

2. Background Information

The need for fast and efficient optical switching devices is increasing as Internet data traffic growth rate is overtaking voice traffic pushing the need for optical communications. Two commonly found types of optical switching devices are mechanical switching devices and electro-optic switching devices.

Mechanical switching devices generally involve physical components that are placed in the optical paths between optical fibers. These components are moved to cause switching action. Micro-electronic mechanical systems (MEMS) have recently been used for miniature mechanical switches. MEMS are popular because they are silicon based and are processed using somewhat conventional silicon processing technologies. However, since MEMS technology generally rely upon the actual mechanical movement of physical parts or components, MEMS are generally limited to slower speed optical applications, such as for example applications having response times on the order of milliseconds.

In electro-optic switching devices, voltages are applied to selected parts of a device to create electric fields within the device. The electric fields change the optical properties of selected materials within the device and the electro-optic effect results in switching action. Electro-optic devices typically utilize electro-optical ceramic materials that combine optical transparency with voltage-variable optical behavior. One typical type of single crystal electro-optical material used in electro-optic switching devices is lithium niobate ($LiNbO_3$).

Lithium niobate is a transparent, material that exhibits electro-optic properties such as the Pockels effect. The Pockels effect is the optical phenomenon in which the refractive index of a medium, such as lithium niobate, varies with an applied electric field. The varied refractive index of the lithium niobate may be used to provide switching. The applied electrical field is provided to present day electro-optical switching devices by external control circuitry.

Although the switching speeds of these types of devices are very fast, for example on the order of nanoseconds, one disadvantage with present day electro-optic switching devices is that these devices generally require relatively high voltages in order to switch optical beams. Consequently, the external circuits utilized to control present day electro-optical switching devices are usually specially fabricated to generate the high voltages and suffer from large amounts of power consumption. In addition, integration of these external high voltage control circuits with present day electro-optical switching devices is becoming an increasingly challenging task as device dimensions continue to scale down and circuit densities continue to increase.

SUMMARY OF THE INVENTION

An apparatus and method for switching an optical beam are disclosed. In one embodiment, a presently described optical switching device includes a semiconductor substrate of an integrated circuit die. A first array of capacitors is disposed in the semiconductor substrate. The first array is coupled to receive a signal. The capacitors modulate a charge region in the first array of capacitors in response to the signal. A first optical port is optically coupled to the first array of capacitors through the semiconductor substrate. A second optical port is also optically coupled to the first array of capacitors through the semiconductor substrate. Additional features and benefits of the present invention will become apparent from the detailed description, figures and claims set forth below.

BRIEF DESCRIPTION OF THE DRAWINGS

The present invention is illustrated by way of example and not limitation in the accompanying figures.

DETAILED DESCRIPTION

A method and an apparatus for switching an optical beam is disclosed. In the following description numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

For purposes of this description, the terms wafer and substrate include any structure having an exposed surface with which to form the integrated circuit structure of the present invention. Both wafer and substrate include, but are not limited to, doped and undoped semiconductors, epitaxy semiconductor layers supported by a base semiconductor or insulator, well regions, as well as other semiconductor structures well-known to one skilled in the art. The term conductor is understood to include conductors and semiconductors, and the term insulator is designed to include any material that is less electrically conductive than the materials referred to as conductors. The following description is, therefore, not to be taken in a limiting sense, and the scope of a present invention is defined only by the appended claims, along with the full scope to which such claims are entitled. Moreover, it is appreciated that the drawings are provided for explanation purposes and have not necessarily been drawn to scale.

In one embodiment of the present invention, a silicon-based optical switch or router is provided in a fully integrated solution on a single integrated circuit chip. One embodiment of the presently described optical switch can be used in a variety of high bandwidth applications including multi-processor, telecommunications, networking or the like. In one embodiment, the presently described optical modulator includes an array of trench capacitors disposed in a silicon semiconductor substrate. In one embodiment, the array of trench capacitors may be referred to as a phase array. In one embodiment, charge in the array is modulated by the trench capacitors to switch an optical beam directed through the array in response to a signal. In one embodiment, the control circuitry used to generate the signal is integrated in the same silicon as the array. Thus, in one embodiment the array and the control circuitry are fully integrated on the same integrated circuit chip. In one embodiment, the optical beam is switched by the array selectively attenuating the optical beam. In another embodiment, the optical beam is switched by selectively modulating the phase of at least a portion of the optical beam.

In one embodiment, a one-dimensional array is formed with the trench capacitors in the semiconductor substrate. In another embodiment, a two-dimensional array is formed with the trench capacitors in the semiconductor substrate. In one embodiment, a phase array including uncharged and selectively modulated charged regions is provided by the array trench capacitors. In one embodiment, the interference intensity pattern caused by the phase array is modulated in response to a signal. For instance, by selectively biasing individual trench capacitors in one embodiment of the phase array, the charge distribution across the phase array can be controlled by the signal in one embodiment of the present invention.

As a result, the amount of phase modulation of different portions of the optical beam passing through different portions the phase array is controlled by the signal in one embodiment. A resulting interference occurs between the phase modulated portions and non-phase modulated portions of the optical beam. The interference among the different portions of the optical beam results in an interference intensity pattern of the phase array, which may be controlled by the signal in one embodiment of the present invention. By adjusting the interference intensity pattern of the phase array, an incident optical beam is selectively directed to one of a plurality of output ports in accordance with the teachings of the present invention.

In one embodiment, a plurality of phase arrays are disposed on the same semiconductor substrate to provide an M×N channel optical switch or router. In another embodiment, a multi-wavelength optical beam is separated into a plurality of single-wavelength optical beams. Each of these single-wavelength optical beams may then be directed to a corresponding phase array to be selectively directed to any one of a plurality of output ports of an optical switching device in one embodiment of the present invention.

Figure 1:
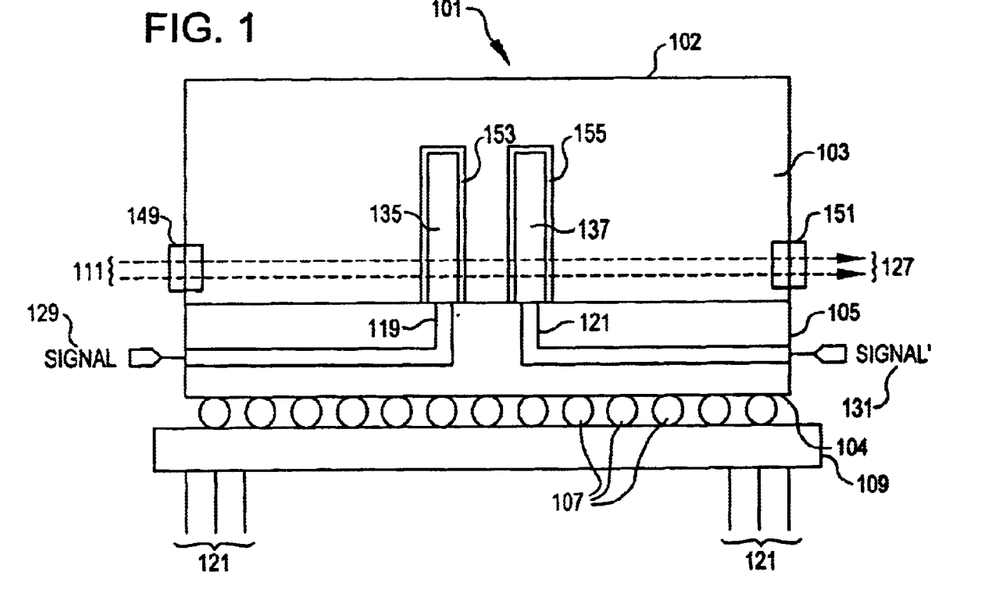
FIG. 1 is a cross-section illustration of one embodiment of an optical switching device in accordance with the teachings of the present invention.

FIG. 1 is a cross-section illustration of one embodiment of an optical switching device 101 in accordance with the teachings of the present invention. In one embodiment, optical switching device 101 is a controlled collapse chip connection (C4) or flip chip packaged integrated circuit die coupled to package substrate 109 through ball bonds 107. As can be appreciated by those skilled in the art, ball bonds 107 provide more direct connections between the internal integrated circuit nodes of optical switching device 101 and the pins 121 of package substrate 109, thereby reducing inductance problems associated with typical wire bond integrated circuit packaging technologies. In one embodiment, the internal integrated circuit nodes of optical switching device 101 are located towards the front side 104 of optical switching device 101. Another characteristic of flip chip packaging is that full access to a back side 102 of optical switching device 101 is provided. It is appreciated that in another optical switching device 101 is not limited to being mounted in a flip chip packaged configuration.

In one embodiment, the optical switching device 101 of the present invention includes an array of trench capacitors including trench capacitor 135 and trench capacitor 137, as illustrated in FIG. 1. In one embodiment, trench capacitors 135 and 137 include polysilicon disposed in a semiconductor substrate 103 of optical switching device 101. In one embodiment, semiconductor substrate 103 includes silicon. As illustrated in FIG. 1, one embodiment of optical switching device 101 includes an insulating region 153 disposed between the polysilicon of trench capacitor 135 and the semiconductor substrate 103 and an insulating region 155 disposed between the polysilicon of trench capacitor 137 and the semiconductor substrate 103.

In one embodiment, a signal 129 and a signal' 131 are coupled to be received by trench capacitors 135 and 137, respectively. In one embodiment, signal 129 and signal' 131 are generated by control circuitry on the integrated circuit die of optical switching device 101. In another embodiment, signal 129 and signal' 131 are generated by control circuitry external to the integrated circuit die of optical switching device 101. In one embodiment, signal 129 and signal' 131 are coupled to be received by trench capacitors 135 through conductors 119 and 121, which are disposed in an insulating layer 105 of optical switching device 101. In one embodiment, insulating layer 105 includes a dielectric layer of optical switching device 101.

In one embodiment, signal 129 and signal' 131 are a plurality of signals separately coupled to be received by the trench capacitors 135 and 137 in the array. For example, in one embodiment, signal 129 and signal' 131 are the same signals having opposite polarities. In another embodiment, signal 129 and signal' 131 are the same signals having the same polarities. In yet another embodiment, signal 129 and signal' 131 are separate signals coupled to capacitors across the array to control or modulate a charge distribution of free charge carriers across the array of trench capacitors 135 and 137.

As illustrated in FIG. 1, one embodiment of optical switching device 101 includes an optical input port 149 and an optical output port 151 disposed in or optically coupled to semiconductor substrate 103 on different sides of the array of trench capacitors 135 and 137. In one embodiment, an optical beam 111 is directed optical input port 149 and through semiconductor substrate 103 to the array of trench capacitors 135 and 137. As mentioned, in one embodiment, semiconductor substrate 103 includes silicon, trench capacitors 135 and 137 include polysilicon and optical beam 111 includes infrared or near infrared laser light. As known to those skilled in the art, silicon is partially transparent to infrared or near infrared light. For instance, in one embodiment in which optical switching device 101 is utilized in telecommunications, optical beam 111 has an infrared wavelength of approximately 1.55 or 1.3 micrometers.

As will be discussed, optical beam 111 is switched by the array of trench capacitors 135 and 137. A switched optical beam 127 is then directed from the array of trench capacitors 135 and 137 through semiconductor substrate 103 to optical output port 151. It is appreciated that in other embodiments (not shown), optical beam 111 and switched optical beam 127 may enter and/or exit semiconductor substrate 103 through back side 102 and/or front side 104 in accordance with the teachings of the present invention.

Figure 2:
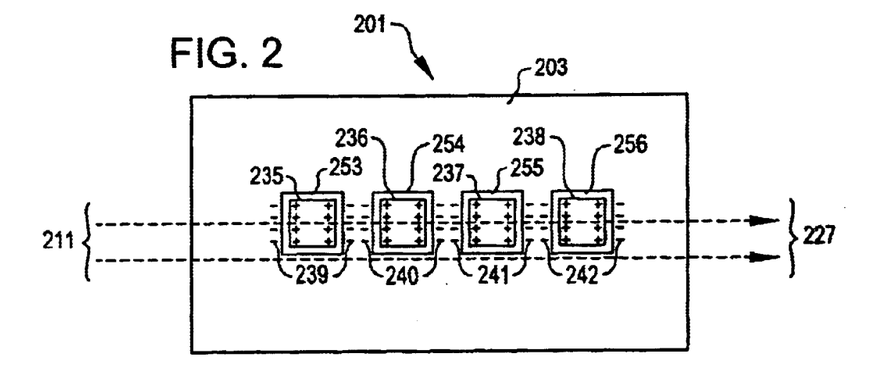
FIG. 2 is a top view illustration of one embodiment of an optical switching device that is biased to modulate a phase of a portion of an optical beam in accordance with the teachings of the present invention.

FIG. 2 is a top view illustration of one embodiment of an optical switching device 201 that is biased such that an optical beam 211 is switched in accordance with the teachings of the present invention. As illustrated, an array of trench capacitors 235, 236, 237 and 238 are disposed in a semiconductor substrate 203. Insulating layers 253, 254, 255 and 256 are disposed between the semiconductor substrate 203 and polysilicon of trench capacitors 235, 236, 237 and 238, respectively. In the depicted embodiment, trench capacitors 235, 236, 237 and 238 are biased in response to signal voltages such that the concentration of free charge carriers in charged regions 239, 240, 241 and 242 of the array of trench capacitors is modulated. In one embodiment, an optical beam 211 is directed through semiconductor substrate 203 such that a portion of optical beam 211 is directed to pass through the modulated charge regions 239, 240, 241 and 242 and a portion of optical beam 211 is not directed to pass through the modulated charge regions 239, 240, 241 and 242. As a result of the modulated charge concentration in charged regions 239, 240, 241 and 242, optical beam 211 is switched resulting in switched optical beam 227 being directed from the array of trench capacitors through semiconductor substrate 203.

In one embodiment, semiconductor substrate 203 is doped to include free charge carriers. In one embodiment, semiconductor substrate 203 is n type doped silicon and the free charge carriers are electrons. In another embodiment, semiconductor substrate 203 is p type doped silicon and the free charge carriers are holes. In one embodiment, the polysilicon of trench capacitors 235, 236, 237 and 238 is n type doped polysilicon and the free charge carriers are electrons. In another embodiment, the polysilicon of trench capacitors 235, 236, 237 and 238 are p type doped polysilicon and the free charge carriers are holes.

In one embodiment, the free charge carriers attenuate optical beam 211 when passing through semiconductor substrate 203. In particular, the free charge carriers attenuate optical beam 211 by converting some of the energy of optical beam 211 into free charge carrier energy.

In another embodiment, the phase of the portion of optical beam 211 that passes through the charged regions 239, 240, 241 and 242 is modulated in response to the signal. In one embodiment, the phase of optical beam 211 passing through free charge carriers in charged regions 239, 240, 241 and 242 is modulated due to the plasma optical effect. The plasma optical effect arises due to an interaction between the optical electric field vector and free charge carriers that may be present along the propagation path of the optical beam 211. The electric field of the optical beam 211 polarizes the free charge carriers and this effectively perturbs the local dielectric constant of the medium. This in turn leads to a perturbation of the propagation velocity of the optical wave and hence the refractive index for the light, since the refractive index is simply the ratio of the speed of the light in vacuum to that in the medium. The free charge carriers are accelerated by the field and also lead to absorption of the optical field as optical energy is used up. Generally the refractive index perturbation is a complex number with the real part being that part which causes the velocity change and the imaginary part being related to the free charge carrier absorption. The amount of phase shift φ is given by $$\phi = (2\pi/\lambda)\Delta n L \qquad \text{(Equation 1)}$$

with the optical wavelength λ and the interaction length L. In the case of the plasma optical effect in silicon, the refractive index change Δn due to the electron (ΔN_e) and hole (ΔN_h) concentration change is given by:

$$\Delta n = -\frac{e^2 \lambda^2}{8\pi^2 c^2 \varepsilon_0 n_0} \left( \frac{b_e (\Delta N_e)^{1.05}}{m_e^*} + \frac{b_h (\Delta N_h)^{0.8}}{m_h^*} \right) \qquad \text{(Equation 2)}$$

where $n_o$ is the nominal index of refraction for silicon, e is the electronic charge, c is the speed of light, $\epsilon_0$ is the permittivity of free space, $m_e^*$ and $m_h^*$ are the electron and hole effective masses, respectively, $b_e$ and $b_h$ are fitting parameters.

In one embodiment, the amount of phase shift φ of some portions of optical beam 211 passing through the free charge carriers of charged regions 239, 240, 241 and 242 is approximately π/2. In one embodiment, the phase of a portion of optical beam 211 not passing though the free charge carriers of charged regions 239, 240, 241 and 242, i.e. passing through uncharged regions, is relatively unchanged. In one embodiment, a resulting interference occurs between the phase modulated portions and non-phase modulated portions of optical beam 211 passing through the array of trench capacitors 235, 236, 237 and 238.

It is noted that optical switching device 201 has been illustrated in FIG. 2 with four trench capacitors 235, 236, 237 and 238. It is appreciated that in other embodiments, optical switching device 201 may include a greater or fewer number of trench capacitors in accordance with the teachings of the present invention with the number of trench capacitors chosen to achieve the required phase shift.

Figure 3:
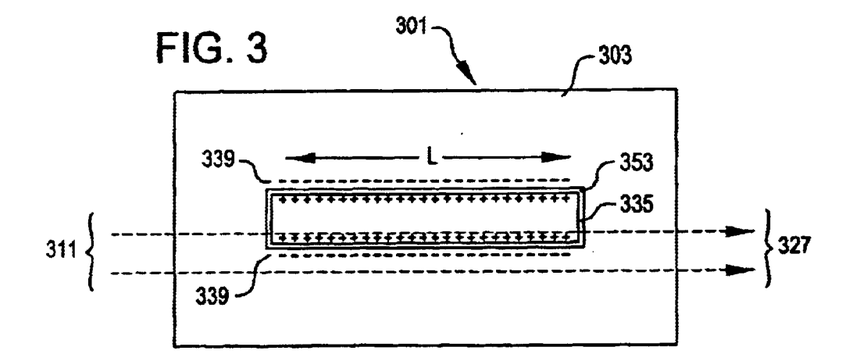
FIG. 3 is a top view illustration of another embodiment of an optical switching device that is biased to modulate a phase of a portion of an optical beam in accordance with the teachings of the present invention.

FIG. 3 is a top view illustration of another embodiment of an optical switching device 301 that is biased such that an optical beam 311 is switched in accordance with the teachings of the present invention. As illustrated, one embodiment of optical switching device 301 includes a trench capacitor 335 disposed in a semiconductor substrate 303. An insulating layer 353 is disposed between the polysilicon of trench capacitor 335 and semiconductor substrate 303. In one embodiment, trench capacitor 335 is one of a plurality or array of trench capacitors disposed in semiconductor substrate 303. In the depicted embodiment, trench capacitor 335 is biased in response to a signal such that the concentration of free charge carriers in charged regions 339 is modulated. In one embodiment, an optical beam 311 is directed through semiconductor substrate 303 such that a portion of optical beam 311 is directed to pass through the modulated charge regions 339 and a portion of optical beam 311 is not directed to pass through the modulated charge region 339. As a result of the modulated charge concentration in charged region 339, optical beam 311 is switched resulting in switched optical beam 327 being directed from trench capacitor 335 through semiconductor substrate 303.

In one embodiment, the phase of the portion of optical beam 311 that passes through the charged regions 339 is modulated in response to the signal due to the plasma optical effect discussed above. As can be observed from Equation 1 above, one way to increase the phase shift φ in optical beam 311 is to increase the interaction length L of the charged region 339. In one embodiment, an increase interaction length L is provided by trench capacitor 335 by providing an increased dimension L, as illustrated in FIG. 3.

Figure 4:
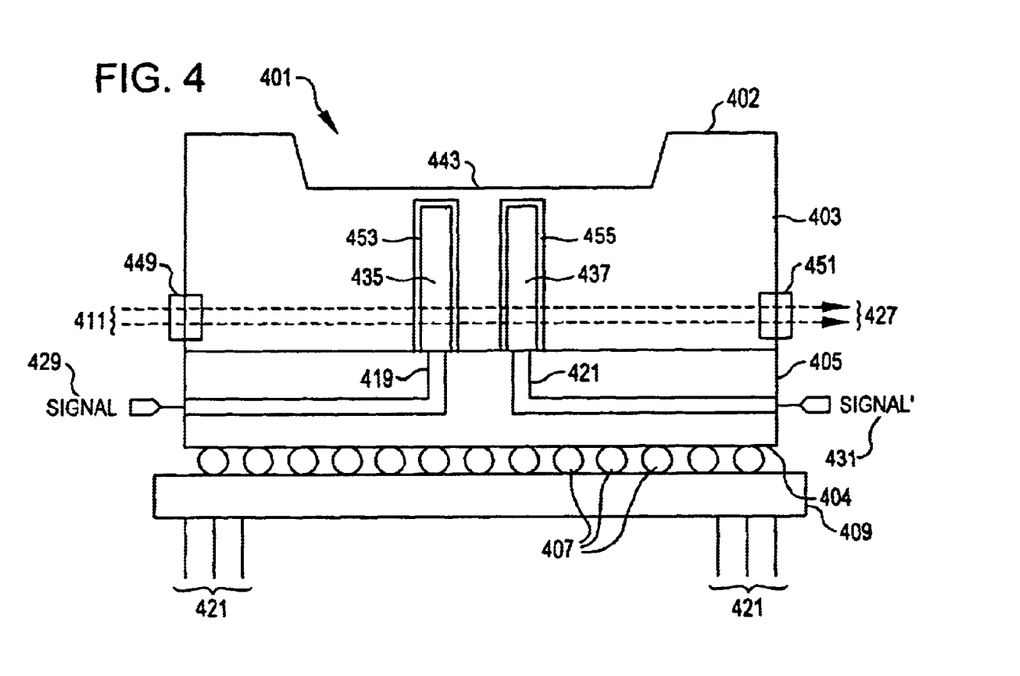
FIG. 4 is a top view illustration of yet another embodiment of an optical switching device including an optical beam confinement region in accordance with the teachings of the present invention.

FIG. 4 is a top view illustration of yet another embodiment of an optical switching device 401 including an optical beam confinement region 443 in accordance with the teachings of the present invention. Optical switching device 401 is similar to the optical switching device 101 of FIG. 1 insofar as one embodiment of optical switching device 401 includes a plurality of trench capacitors 435 and 437 disposed in a semiconductor substrate 403 between an optical input port 449 and an optical output port 451. In one embodiment, insulating regions 453 and 455 are disposed between semiconductor substrate 403 and the polysilicon of trench capacitors 435 and 437, respectively. In one embodiment, a signal 429 is coupled to be received by trench capacitor 435 through conductor 419 and a signal' 431 is coupled to be received by trench capacitor 437 through conductor 421. In one embodiment, conductor is 419 and 421 are disposed in a dielectric layer 405 of optical switching device 401. In one embodiment, optical switching device 401 is packaged as a flip-chip packaged integrated circuit.

As illustrated in FIG. 4, optical switching device 401 also includes an optical confinement region 443. In the embodiment depicted, optical beam confinement region 443 includes a recess or trench included in the back side 402 of the semiconductor substrate 403 in the region that includes the plurality of trench capacitors 435 and 437. In one embodiment, the back side 402 is thinned or etched using known techniques to form optical confinement region 443. In another embodiment, optical beam confinement region 443 may also include recesses or trenches included in the sides of the semiconductor substrate 403. By thinning the semiconductor substrate 403 in this region, a waveguide including the array of trench capacitors 435 and 437 is provided by semiconductor substrate 403. Thus, optical beam 411 is confined within semiconductor substrate 403 to be directed through the array of trench capacitors 435 and 437 to produce switched optical beam 427 at optical output port 451.

Figure 5:
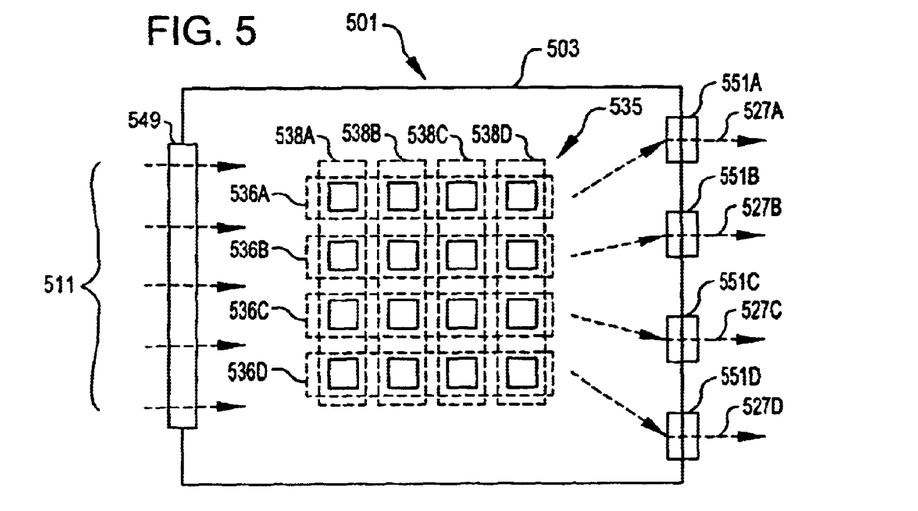
FIG. 5 is a top view illustration of one embodiment of an optical switching device including a phase array to selectively direct an incident optical beam to one of a plurality of output ports in accordance with the teachings of the present invention.

FIG. 5 is a top view illustration of yet another embodiment of an optical switching device 501 including a phase array 535 having a plurality of trench capacitors to selectively direct an optical beam 511 to one of a plurality of output ports in accordance with the teachings of the present invention. As illustrated, optical switching device 501 includes an optical input port 549 optically coupled to one side of semiconductor substrate 503. Optical switching device 501 also includes a plurality of optical output ports 551A, 551B, 551C and 551D optically coupled to the opposite side of semiconductor substrate 503. A phase array 535 including an array of trench capacitors is disposed in the semiconductor substrate 503 between optical input port 549 and optical output ports 551A, 551B, 551C and 551D. In the depicted embodiment, optical beam 511 is directed from optical input port 549 through semiconductor substrate 503 to the phase array 535.

In one embodiment phase array 535 is a two-dimensional array of trench capacitors including a plurality of rows 536A, 536B, 536C and 536D of trench capacitors and a plurality of columns 538A, 538B, 538C and 538D of trench capacitors. In another embodiment, phase array 535 is a one-dimensional array of trench capacitors including a plurality of rows 536A, 536B, 536C and 536D. In one embodiment, each row 536A, 536B, 536C and 536D are coupled to receive one of a plurality signals to bias each individual row 536A, 536B, 536C and 536D of the phase array 535. In another embodiment, each trench capacitor in a two dimensional phase array 535 is separately coupled to receive one of a plurality signals of a signal to bias the phase array 535.

Operation of one embodiment of phase array 535 is as follows. In one embodiment, semiconductor substrate 503 is doped to include free charge carriers. In one embodiment, at least each row 536A, 536B, 536C and 536D of phase array 535 is separately biased by the signal to control a charge distribution across phase array 535. For instance, assume in one example that semiconductor substrate 503 is n type doped silicon and that the free charge carriers are therefore electrons. Assume further that the trench capacitors in row 536A are coupled to receive for example +3 volts from the signal, the trench capacitors in row 536B are coupled to receive +2 volts, the trench capacitors in row 536C are coupled to receive +1 volt and that the trench capacitors in row 536D are coupled to receive +0.5 volts. It is appreciated that these voltages are provided for explanation purposes only and that other voltages can be applied as appropriate. Since each trench capacitor is coupled to a positive voltage in this example, each trench capacitor will attract electrons in semiconductor substrate 503. In addition, the trench capacitors that are coupled to receive a higher voltage of the signal will attract more electrons. As a result, the charge density of the free charge carriers will be proportional to the voltage applied to the particular trench capacitor. Thus, in one embodiment, there is a gradient in the charge distribution of free charge carriers across phase array 535, which is controlled by the signal.

Continuing with the example discussed above with reference to FIG. 5, assume now that optical beam 511 is directed from optical input port 549 through semiconductor substrate 503 to phase array 535. A portion of optical beam 511 will pass through the trench capacitors of row 536A. A portion of optical beam 511 will pass through the semiconductor substrate 503 between rows 536A and 536B. A portion of optical beam 511 will pass through the trench capacitors of row 536B. A portion of optical beam 511 will pass through the semiconductor substrate 503 between rows 536B and 536C. A portion of optical beam 511 will pass through the trench capacitors of row 536C. A portion of optical beam 511 will pass through the semiconductor substrate 503 between rows 536C and 536D. Finally, a portion of optical beam 511 will pass through the trench capacitors of row 536D.

The portions of optical beam 511 passing through rows 536A, 536B, 536C and 536D of phase array 535 will experience a modulation of phase since these portions of optical beam 511 pass through the densely charged regions, similar to that illustrated in the example of FIG. 2. In one embodiment, at least some portions of optical beam 511 that are phase modulated are phase shifted by approximately 2π.

The portion of optical beam 511 passing through row 536A will experience more phase modulation than the portion of optical beam 511 passing through row 536D since the free charge carrier density is greater in row 536A than in row 536D due to the higher applied voltage. The portions of optical beam 511 passing between the rows will experience relatively no phase modulation, since there are substantially no free charge carriers in these portions of phase array 535. A resulting diffraction interference occurs between the phase modulated portions and non-phase modulated portions of optical beam 511. The interference among the different portions of the optical beam results in an interference intensity pattern caused by phase array 535, which may be controlled by the signal as applied to the trench capacitors of phase array 535.

As can be appreciated to those skilled in the art, the interference intensity pattern includes a plurality of maximas that are directed away from phase array 535 at an angle θ relative to the incident optical beam. In one embodiment of the present invention, the interference intensity pattern of a phase array 535 can be controlled by a signal controlling the distribution of charge across phase array 535. As a result, the angular locations θ of the maximas of the interference intensity pattern caused by phase array 535 can be controlled by the signal applied to the trench capacitors of phase array 535. Thus, the signal applied to phase array 535 can be used to selectively direct optical beam 511 to either optical output port 551A, 551B, 551C or 551D. In one embodiment, each optical output port 551A, 551B, 551C or 551D represents a different output channel of optical switching device 501.

In one embodiment, the number, length and spacing of trench capacitors in phase array 535 are determined by the number of output channels of optical switching device 501. By applying the appropriate bias voltages to the trench capacitors of phase array 535 to control the gradient of the charge distribution across phase array 535, the resulting interference of the outgoing optical beam 527A, 527B, 527C or 527D is directed or steered to the optical output port 551A, 551B, 551C or 551D of interest. That is, by appropriately controlling the gradient of the charge distribution across phase array 535, the maximas of interference intensity pattern caused by phase array 535 can be shifted to illuminate the selected optical output port 551A, 551B, 551C or 551D.

It is appreciated that the embodiment of phase array 535 illustrated in FIG. 5 has a symmetric geometry of rows and columns. It is appreciated that in other embodiments, phase array 535 is not limited to having a symmetric geometry. For instance, FIG. 6 is an illustration of another embodiment of an optical switching device 601 including a phase array 635 having a plurality of capacitors arranged in an asymmetric geometry in accordance with the teachings of the present invention.

As illustrated, optical switching device 601 includes an optical input port 649 optically coupled to one side of semiconductor substrate 603. Optical switching device 601 also includes a plurality of optical output ports 651A, 651B, 651C and 651D optically coupled to a different side of semiconductor substrate 503. Phase array 635 including an array of trench capacitors is disposed in the semiconductor substrate 603 between optical input port 649 and optical output ports 651A, 651B, 651C and 651D. In the depicted embodiment, optical beam 611 is directed from optical input port 649 through semiconductor substrate 603 to the phase array 635.

In one embodiment phase array 635 is a two-dimensional array of trench capacitors including a plurality of rows 636A, 636B, 636C and 636D of trench capacitors and a plurality of columns 638A, 638B, 638C and 638D of trench capacitors. In another embodiment, phase array 635 is a one-dimensional array of trench capacitors including a plurality of rows 636A, 636B, 636C and 636D. In one embodiment, each row 636A, 636B, 636C and 636D are coupled to receive one of a plurality signals to bias each individual row 636A, 636B, 636C and 636D of the phase array 635. In another embodiment, each trench capacitor in a two dimensional phase array 635 is separately coupled to receive one of a plurality signals of a signal to bias the phase array 635.

Figure 6:
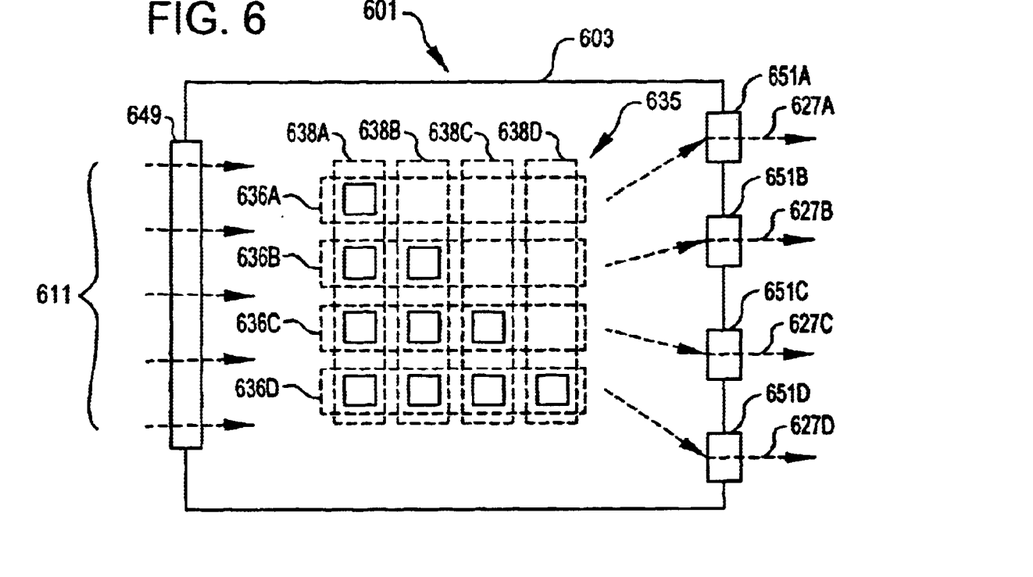
FIG. 6 is a top view illustration of another embodiment of an optical switching device including a phase array having an asymmetric geometry to selectively direct an incident optical beam to one of a plurality of output ports in accordance with the teachings of the present invention.

As illustrated in FIG. 6, each row 636A, 636B, 636C and 636D of phase array 635 is not limited to having the same number of capacitors. Similarly, each column 636A, 636B, 636C and 636D of phase array 635 is not limited to having the same number of capacitors. In operation, each row and/or column of phase array 635 in one embodiment may be coupled to receive fixed voltages or the same voltages to modulate the charge distribution of free charge carriers across phase array 635. Since the geometry of the arrangement of capacitors in phase array 635 has been varied to be asymmetric, there is a gradient in the charge distribution of free charge carriers across phase array 635, even though a fixed voltage or the same voltage is applied to each row 636A, 636B, 636C and 636D and/or column 636A, 636B, 636C and 636D of phase array 635. In another embodiment, a combination of fixed voltages and different voltages are utilized in accordance with the teachings of the present invention.

In operation, the portions of optical beam 611 passing through rows 636A, 636B, 636C and 636D of phase array 635 will experience a modulation of phase since these portions of optical beam 611 pass through the densely charged regions, similar to that illustrated in the example of FIG. 2. The portion of optical beam 611 passing through row 636A will experience less phase modulation than the portion of optical beam 611 passing through row 636D since the free charge carrier density is greater in row 636D than in row 636A since there are more charged capacitors, and therefore more free charge carriers, in row 636D. The portions of optical beam 611 passing between the rows will experience relatively no phase modulation, since there are substantially no free charge carriers in these portions of phase array 635. A resulting diffraction interference occurs between the phase modulated portions and non-phase modulated portions of optical beam 611. The interference among the different portions of the optical beam results in an interference intensity pattern caused by phase array 635, which may be controlled by the signal as applied to the trench capacitors of phase array 635.

Thus, by applying the appropriate bias voltages to the trench capacitors of a phase array 635 having an appropriate geometry to control the gradient of the charge distribution across phase array 635, the resulting interference of the outgoing optical beam 627A, 627B, 627C or 627D is directed or steered to the optical output port 651A, 651B, 651C or 651D of interest.

In yet another embodiment, some or all of the individual capacitors within a particular row and/or column are selectively charged by the signal to control the gradient in the charge distribution of free charge carriers across the phase array. In this embodiment, a fixed voltage or the same voltage could be applied by the signal to charge some selected particular rows and/or columns of capacitors to control charge distribution across the phase array. Thus, the phase array is charged asymmetrically by the signal to control or steer the incident optical beam to the selected optical output port. In this embodiment, the phase array could have a symmetric or asymmetric arrangement of rows and columns, and the rows and/or columns of capacitors in the phase array would be symmetrically or asymmetrically charged by the signal.

Figure 7:
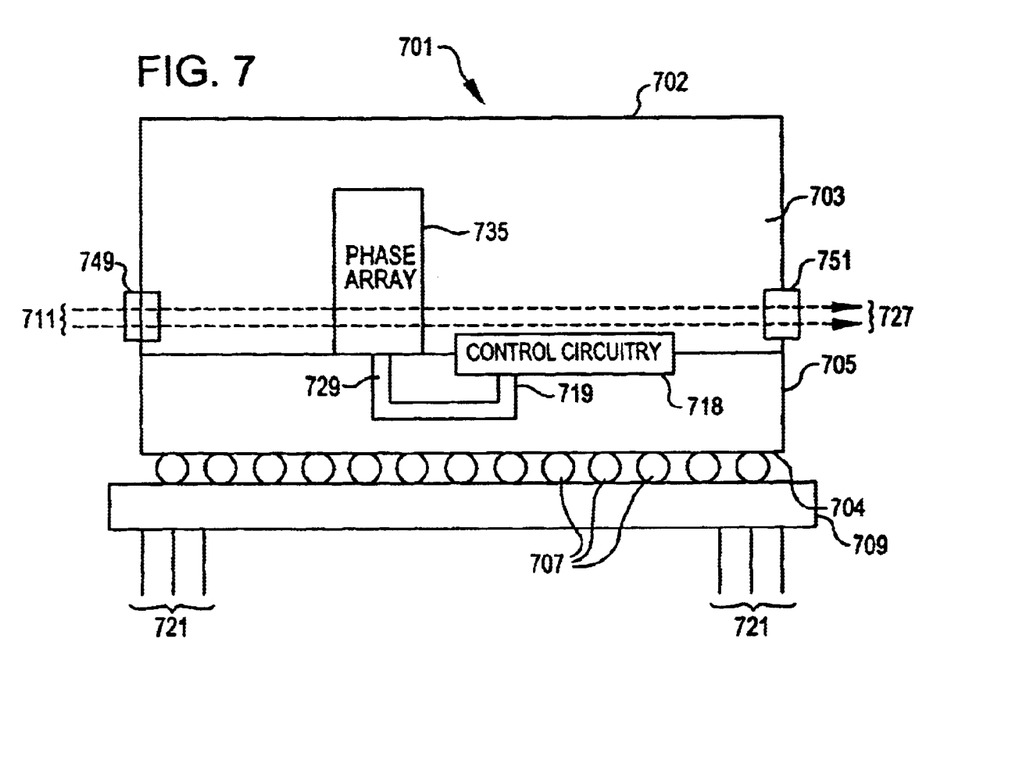
FIG. 7 is a cross-section illustration of one embodiment of an optical switching device including a phase array and control circuitry disposed in the same integrated circuit die in accordance with the teachings of the present invention.

In one embodiment, the signals used to bias the trench capacitors of the phase array are generated by control circuitry disposed on the same semiconductor substrate as the trench capacitors. To illustrate, FIG. 7 is a cross-section illustration of one embodiment of an optical switching device 701 including a phase array 735 and control circuitry 718 disposed in the same integrated circuit die in accordance with the teachings of the present invention. In one embodiment, optical switching device 701 is packaged as a flip-chip packaged integrated circuit.

As shown in the embodiment depicted, optical switching device 701 includes a phase array 735 disposed in a semiconductor substrate 703 between an optical input port 749 and an optical output port 751. In one embodiment, control circuitry 718 is disposed in semiconductor substrate 703 and generates a signal 729, which is coupled to be received by phase array 735 through conductor 719. In one embodiment, conductor 719 is disposed in a dielectric layer 705 of the integrated circuit die of optical switching device 701. In one embodiment, signal 729 includes a plurality of signals, each of which is coupled to be received by a particular trench capacitor or row of trench capacitors included in phase array 735. In one embodiment, conductor 719 is one of a plurality of conductors coupled between phase array 735 and control circuitry 718 to provide signals. In one embodiment, portions of control circuitry 718 may include digital circuitry, analog circuitry, logic circuitry, driver circuitry or the like. In another embodiment, control circuitry 718 is disposed on a different or separate semiconductor substrate than phase array 735.

In operation, one embodiment of optical switching device 711 is configured such that an optical beam 711 is directed from optical input port 749 through semiconductor substrate 703 to phase array 735. A charge distribution across phase array 735 is controlled in response to a signal 729, which is generated by control circuitry 718. As a result, a switched optical beam 727 is directed from phase array 735 through semiconductor substrate 703 to optical output port 751.

Figure 8:
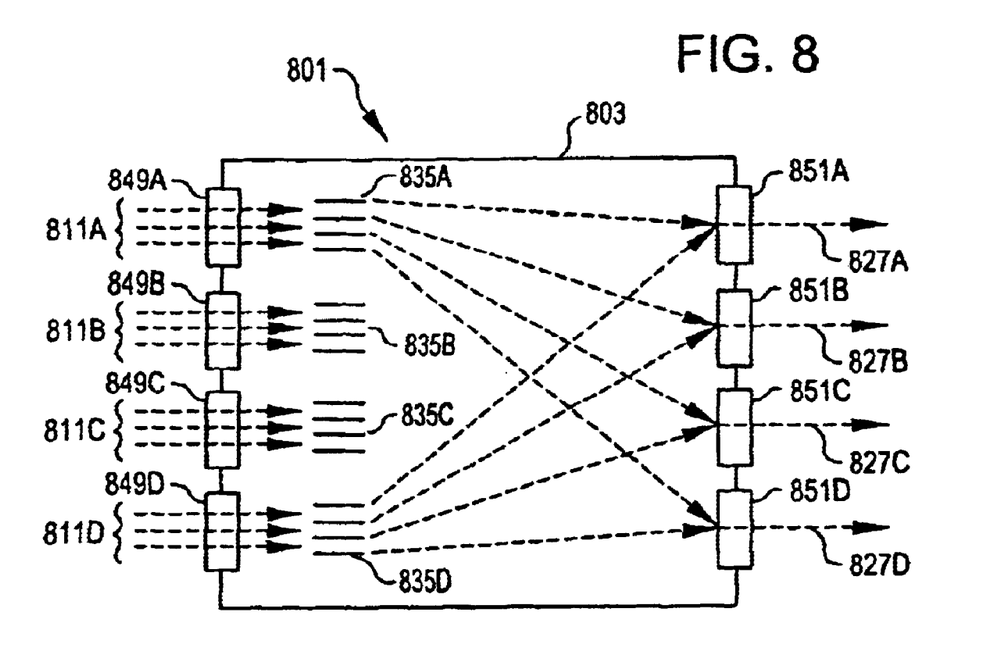
FIG. 8 is a top view illustration of another embodiment of an optical switching device including a plurality of phase arrays, each of which is to selectively direct an incident optical beam to one of a plurality of output ports in accordance with the teachings of the present invention.

FIG. 8 is a top view illustration of an M×N optical switching device 801 in accordance with the teachings of the present invention. As illustrated in the depicted embodiment, optical switching device 801 includes a plurality of (M) input optical input ports 849A, 849B, 849C and 849D optically coupled to semiconductor substrate 803. In one embodiment, optical switching device 801 also includes a plurality of (N) optical output ports 851A, 851B, 851C and 851D optically coupled to semiconductor substrate 803. In the embodiment illustrated in FIG. 8, M and N area equal to 4. It is appreciated that M and N may be equal to numbers other than 4 in accordance with the teachings of the present invention.

In one embodiment, optical switching device 801 also includes a plurality of (M) phase arrays 835A, 835B, 835C and 835D. In one embodiment, an optical beam 811A is directed from optical input port 849A through semiconductor substrate 803 to phase array 835A. Similarly, optical beams 811B, 811C and 811D are directed from optical input ports 849B, 849C and 849D, respectively, through semiconductor substrate 803 to phase arrays 835B, 835C and 835D, respectively. In one embodiment, phase arrays 835A, 835B, 835C and 835D operate similarly to phase array 535 of FIG. 5 or phase array 635 of FIG. 6. Thus, incident optical beams 811A, 811B, 811C and 811D are selectively directed by phase arrays 835A, 835B, 835C and 835D, respectively, to any one of optical output ports 851A, 851B, 851C and 851D. Therefore, an incoming optical beam to any of the M optical input ports of optical switching device 801 can be selectively directed to any one of the N optical output ports in accordance with the teachings of the present invention.

Figure 9:
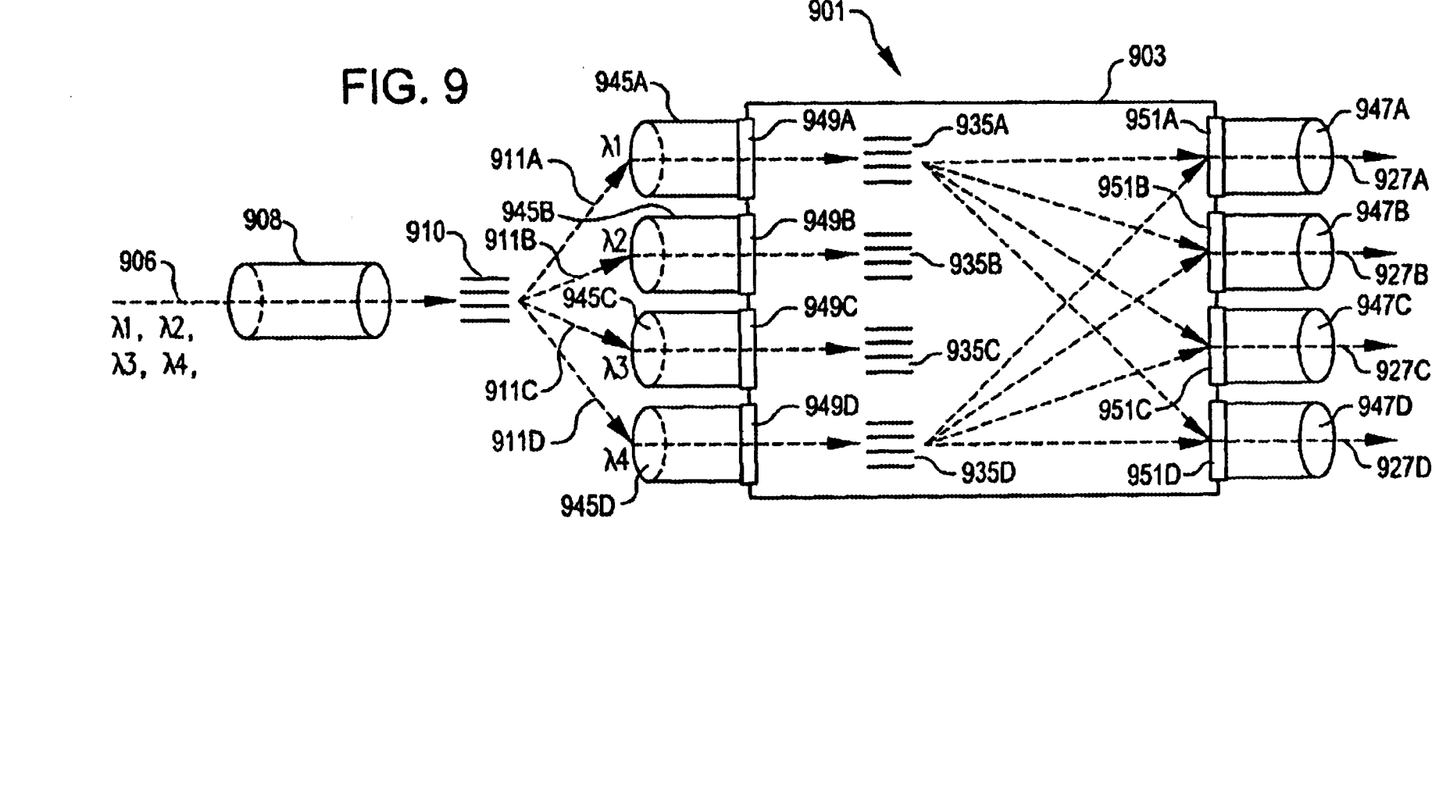
FIG. 9 is a top view illustration of yet another embodiment of an optical switching device including a multi-wavelength splitter to separate an incident multi-wavelength optical beam into a plurality of single-wavelength optical beams, each of which is selectively directed to one of a plurality of output ports in accordance with the teachings of the present invention.

FIG. 9 is a top view illustration of another embodiment of an optical switching device 901 in accordance with the teachings of the present invention. Optical switching device 901 is similar to optical switching device 801 of FIG. 8 with the addition of an optical fiber 908 carrying a multi-wavelength optical beam 906 and multi-wavelength optical splitter 910. In addition, FIG. 9 shows optical fibers 945A, 945B, 945C and 945D to optical input ports 949A, 949B, 949C and 949D, respectively. FIG. 9 also shows optical fibers 947A, 947B, 947C and 947D optically coupled to optical output ports numeral 951A, 951B, 951C and 951D, respectively. In one embodiment, optical fibers 945A, 945B, 945C and 945D and optical fibers 947A, 947B, 947C and 947D are embedded directly into the semiconductor substrate 903.

As illustrated in the example shown in FIG. 9, multi-wavelength optical beam 906 is an optical beam having a plurality of wavelengths $\lambda 1$, $\lambda 2$, $\lambda 3$ and $\lambda 4$. In one embodiment, multi-wavelength optical beam 906 has fixed wavelengths near 1.3 micrometers. In another embodiment, multi-wavelength optical beam 906 is used for telecommunications and the plurality of wavelengths are around 1.55 micrometers. In one embodiment, an optical amplifier (not shown) such as an erbium-doped fiber amplifier (EDFA) is optically coupled to optical fiber 906. As is known to those skilled in the art, erbium doped fiber amplifiers (EDFAs) provide optical amplification by stimulated emission of optical beams having wavelengths around 1.55 micrometers. In addition, as is known to those skilled in the art, EDFAs are also desirable due to their known broad and flat gain spectrum, which makes them suitable for wavelength division multiplexing (WDM) and dense wavelength division multiplexing (DWDM) applications. Thus, in one embodiment, optical switching device 901 is suited for WDM and DWDM applications in accordance with the teachings of the present invention.

As illustrated, in one embodiment, multi-wavelength splitter 910 separates multi-wavelength optical beam 906 into single-wavelength optical beams 911A, 911B, 911C and 911D, having wavelengths of $\lambda 1$, $\lambda 2$, $\lambda 3$ and $\lambda 4$, respectively. In one embodiment, single-wavelength optical beams 911A, 911B, 911C and 911D are directed into M optical fibers 945A, 945B, 945C and 945D, respectively. Similar to optical switching device 801, single-wavelength optical beams 911A, 911B, 911C and 911D are directed through semiconductor substrate 903 to diffractions gratings 935A, 935B, 935C and 935D, respectively. In one embodiment, the charge distributions across each phase array 935A, 935B, 935C and 935D are separately controlled by a signals to selectively direct optical beams 911A, 911B, 911C and 911D to any one of the N output optical output ports 951A, 951B, 951C or 951D.

In the foregoing detailed description, the method and apparatus of the present invention have been described with reference to specific exemplary embodiments thereof It will, however, be evident that various modifications and changes may be made thereto without departing from the broader spirit and scope of the present invention. The present specification and figures are accordingly to be regarded as illustrative rather than restrictive.

What is claimed is:

1. An optical switching device, comprising:
   a semiconductor substrate of an integrated circuit die;
   a first array of capacitors disposed in the semiconductor substrate, the first array coupled to receive an electrical signal, the capacitors to modulate a charge region in the first array of capacitors in response to the electrical signal;
   a first optical port optically coupled to the first array of capacitors through the semiconductor substrate; and
   a second optical port optically coupled to the first array of capacitors through the semiconductor substrate.

2. The optical switching device of claim 1 wherein each one of the capacitors comprise:
   a polysilicon region disposed in the semiconductor substrate; and
   an insulative layer disposed between the polysilicon region and the semiconductor substrate.

3. The optical switching device of claim 1 further comprising control circuitry disposed in the semiconductor substrate of the integrated circuit die, the control circuitry coupled to the first array of capacitors to generate the electrical signal.

4. The optical switching device of claim 1 wherein the electrical signal comprises a plurality of individual electrical signals, each one of the plurality of individual electrical signals coupled to one of the capacitors of the first array of capacitors.

5. The optical switching device of claim 1 wherein a first phase array comprising charged and uncharged regions is formed by the first array of capacitors, the electrical signal to control a charge distribution across the first phase array, an interference intensity pattern of the first phase array to be controlled in response to the charge distribution.

6. The optical switching device of claim 5 wherein the electrical signal comprises a plurality of individual electrical signals, each one of the plurality of individual electrical signals coupled to one of the capacitors of the first array of capacitors to control a gradient of charge distribution across the charged and uncharged regions of the first phase array.

7. The optical switching device of claim 5 wherein the first array of capacitors is arranged in an asymmetric geometry to help control a gradient of the charge distribution across the first phase array.

8. The optical switching device of claim 6 further comprising:
   an optical input port optically coupled to the semiconductor substrate, the optical input port including the first optical port; and
   a plurality of optical output ports optically coupled to the semiconductor substrate, the plurality of optical output ports including the second optical port, the phase array selectively optically coupled to one of the plurality of optical output ports in response to the electrical signal.

9. The optical switching device of claim 6 further comprising:
   a plurality of optical input ports optically coupled to the semiconductor substrate, the plurality of optical input ports including the first optical port;
   a plurality of arrays of capacitors disposed in the semiconductor substrate, the plurality of arrays of capacitors including the first array of capacitors, each one of the plurality of arrays of capacitors optically coupled to a corresponding one of the plurality of optical input ports, each one of the plurality of arrays of capacitors optically coupled to receive one of a plurality of electrical signals; and
   a plurality of optical output ports optically coupled to the semiconductor substrate, each one of the plurality of arrays of capacitors selectively optically coupled to one of the plurality of optical output ports in response to a corresponding one of the plurality of electrical signals.

10. The optical switching device of claim 9 further comprising a multi-wavelength optical splitter optically coupled to the plurality of optical input ports, the multi-wavelength optical splitter to separate a multi-wavelength optical beam directed to the multi-wavelength optical splitter into the plurality of optical beams.

11. The optical switching device of claim 10 wherein the multi-wavelength optical beam comprises wavelengths around 1.55 micrometers.

12. The optical switching device of claim 10 wherein the multi-wavelength optical beam comprises wavelengths around 1.3 micrometers.

13. The optical switching device of claim 5 further comprising an input optical fiber optically coupled to the optical input port and an output optical fiber optically coupled to the optical output port.

14. The optical switching device of claim 1 wherein the semiconductor substrate comprises an optical beam confinement region, the array of capacitors included in the optical beam confinement region bordered by a thinned portion of a back side of the semiconductor substrate.

15. The optical switching device of claim 1 wherein the semiconductor substrate comprises silicon.

16. A method of switching an optical beam, comprising:
   modulating a charge carrier density of a charge region proximate to an array of capacitors disposed in the semiconductor substrate in response to an electrical signal; and
   directing an optical beam through the semiconductor substrate through the charge region of the array of capacitors, the optical beam switched in response to the electrical signal.

17. The method of switching the optical beam of claim 16 further comprising generating the electrical signal with control circuitry disposed in the semiconductor substrate of the integrated circuit die.

18. The method of switching the optical beam of claim 16 further comprising:
   modulating a charge distribution across a phase array including charged and uncharged regions formed by the array of capacitors in response to the electrical signal; and
   selectively directing the optical beam to one of a plurality of optical output ports optically coupled to the semiconductor substrate in response to the electrical signal.

19. The method of switching the optical beam of claim 16 further comprising modulating an interference intensity pattern of the phase array in response to the electrical signal.

20. The method of switching the optical beam of claim 16 further comprising confining the optical beam to be directed through the array of capacitors.

21. The method of switching the optical beam of claim 18 further comprising separating a multi-wavelength optical beam into a plurality of single-wavelength optical beams, wherein the optical beam is one of the plurality of single-wavelength optical beams.

22. The method of switching the optical beam of claim 16 further comprising:
   generating the plurality of individual electrical signals, wherein the electrical signal comprises the plurality of individual electrical signals; and controlling a charge distribution across the phase array by coupling each one of the plurality of individual electrical signals to be received by one of the capacitors in the array of capacitors.

23. The method of switching the optical beam of claim 18 wherein modulating a charge distribution across a phase array comprises asymmetrically charging the array of capacitors to control a gradient of the charge distribution across the array of capacitors.

24. An optical switching device, comprising:
   a semiconductor substrate of an integrated circuit die;
   a first phase array disposed in the semiconductor substrate, the first phase array to cause an interference intensity pattern controlled in response to a first electrical signal;
   a first optical input port optically coupled to the semiconductor substrate, the first optical input port optically coupled to the first phase array through the semiconductor substrate; and
   a plurality of optical output ports optically coupled to the semiconductor substrate, the first phase array selectively optically coupled to one of the plurality of optical output ports through the semiconductor substrate in response to the first electrical signal.

25. The optical switching device of claim 24 further comprising control circuitry disposed in the semiconductor substrate to generate the first electrical signal.

26. The optical switching device of claim 24 wherein the first phase array comprises charged and uncharged regions.

27. The optical switching device of claim 24 wherein the first phase array comprises a first array of capacitors disposed in the semiconductor substrate, each one of the capacitors coupled to receive the first electrical signal to modulate a charge distribution across the first phase array.

28. The optical switching device of claim 27 wherein the first electrical signal comprises a plurality of individual electrical signals, each one of the individual electrical signals coupled to one of the capacitors of the first phase array to modulate the charge distribution across the first phase array.

29. The optical switching device of claim 27 wherein the first array of capacitors is arranged in an asymmetric geometry to help control a gradient of the charge distribution across the first phase array.

30. The optical switching device of claim 24 further comprising:
   a plurality of optical input ports optically coupled to the semiconductor substrate, the plurality of optical input ports including the first optical input port; and
   a plurality of phase arrays disposed in the semiconductor substrate, the plurality of phase arrays including the first phase array, each one of the plurality of phase arrays coupled to receive one of a plurality of electrical signals, the plurality of electrical signals including the first electrical signal, each one of the plurality of phase arrays optically coupled to a corresponding one of the plurality of optical input ports through the semiconductor substrate, each one of the plurality of phase arrays selectively optically coupled to one of the plurality of optical output ports in response to a corresponding one of the plurality of electrical signals.

* * * * *